United States Patent
Olsen et al.

(10) Patent No.: US 10,586,572 B2
(45) Date of Patent: *Mar. 10, 2020

(54) VIDEO SERVICE WITH AUTOMATED VIDEO TIMELINE CURATION

(71) Applicant: Microsoft Technology Licensing, LLC, Redmond, WA (US)

(72) Inventors: William Axel Olsen, Vancouver (CA); David Seymour, Vancouver (CA); Mark Allen Findlay, Surrey (CA); Henry Stuart Watson, Vancouver (CA); William Michael Mozell, North Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/055,015

(22) Filed: Aug. 3, 2018

(65) Prior Publication Data

US 2019/0035430 A1 Jan. 31, 2019

Related U.S. Application Data

(63) Continuation of application No. 13/913,473, filed on Jun. 9, 2013, now Pat. No. 10,068,614.

(60) Provisional application No. 61/819,187, filed on May 3, 2013, provisional application No. 61/816,668, filed on Apr. 26, 2013.

(51) Int. Cl.
*G11B 27/034* (2006.01)
*H04N 21/25* (2011.01)
*H04N 21/475* (2011.01)
*H04N 21/845* (2011.01)
*H04N 21/8549* (2011.01)
*G11B 27/19* (2006.01)

(52) U.S. Cl.
CPC ............ *G11B 27/034* (2013.01); *G11B 27/19* (2013.01); *H04N 21/252* (2013.01); *H04N 21/475* (2013.01); *H04N 21/8456* (2013.01); *H04N 21/8549* (2013.01)

(58) Field of Classification Search
CPC .............................. G11B 27/034; G11B 27/19
See application file for complete search history.

(56) References Cited

U.S. PATENT DOCUMENTS 10,068,614 B2 * 9/2018 Olsen .................. G11B 27/034

* cited by examiner

*Primary Examiner* — Thai Q Tran
*Assistant Examiner* — Girumsew Wendmagegn

(57) ABSTRACT

The subject disclosure is directed towards a technology in which highlight (curated) videos are automatically generated for users to watch based upon estimated interest levels with respect to segments of a longer video or set of videos. In one aspect, statistics are collected with respect to actions of viewers of the video or set of videos. These may include playback-related actions such as the number of times a particular segment is played, and/or behavioral actions of viewers during the playback. Based upon which segments have the highest estimated interest levels, a subset of the segments are selected for a playback list, which when played provides the highlight/curated video.

20 Claims, 7 Drawing Sheets

VIDEO SERVICE WITH AUTOMATED VIDEO TIMELINE CURATION

CROSS-REFERENCE TO RELATED APPLICATION

The present application is a continuation and claims priority to U.S. nonprovisional patent application Ser. No. 13/913,473, which claims priority to U.S. provisional patent application Ser. No. 61/816,668 filed Apr. 26, 2013 and U.S. provisional patent application Ser. No. 61/819,187 filed May 3, 2013.

BACKGROUND

Curating the "best" portions of a video or multiple videos is something that is performed manually by human curators, and is therefore very expensive when large amounts of video are involved. For example, television channel sports shows may put together what they think are the "best" fifteen minutes of football video; this content is manually selected and edited in a professional studio. Narrated shows, sometimes accompanied by music, are another common example in which a popular event, such as a major sports event, is professionally produced (somewhat like a documentary) for mass consumption by a large viewing audience.

However, manual video curation is too time consuming and expensive to create large amounts of highlight videos, such as to cater to the various tastes and specifications of many individual users. For example, one user may want a fifteen sports highlight video that emphasizes his or her favorite sport, such as football, but not one that includes soccer. Another user may desire a video that shows the "best" fifty-three minutes of a popular movie.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a telemetry server is configured to collect statistical information including data representative of user interaction with segments of video content for a plurality of users. An interest calculator mechanism processes the statistical information into a level of interest for each segment. A playlist generator selects selected segments of the video content, based at least in part upon the level of interest for each segment, for inclusion in a playlist that corresponds to a curated video.

One or more aspects may be directed towards collecting statistics related to video playback of segments of content, and processing the statistics to determine a level of interest associated with each segment of the content. One or more selected segments are chosen based at least in part on the level of interest associated with each selected segment. The one or more selected segments are included in a set of data corresponding to a curated video.

In one aspect, statistics are processed to estimate which segments of a video or set of videos are likely most interesting to viewers, wherein at least some of the statistics were collected based upon actions of viewers with respect to the video or set of videos. A data set is built based at least in part upon the processing of the statistics, in which the data set represents a subset of the video segments, and the subset includes segments that are estimated as being likely most interesting. The data set is provided for use in requesting playback of the subset of the segments.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a technology for generating videos for users to watch based upon interest levels of other viewers ("the crowd") and possibly based on each user's (or group of users') own preferences. In one aspect, this is accomplished by automated curation of video, which may be achieved by gathering playback statistics (and possibly other statistics) at each segment of a video's timeline and using those statistics to generate curated videos.

It should be understood that any of the examples herein are non-limiting. For one, example implementations are described in the context of a game console operating environment, however this is only for purposes of explanation, and other operating environments such as mobile device environments may benefit from the concepts described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and content presentation in general.

Figure 1:
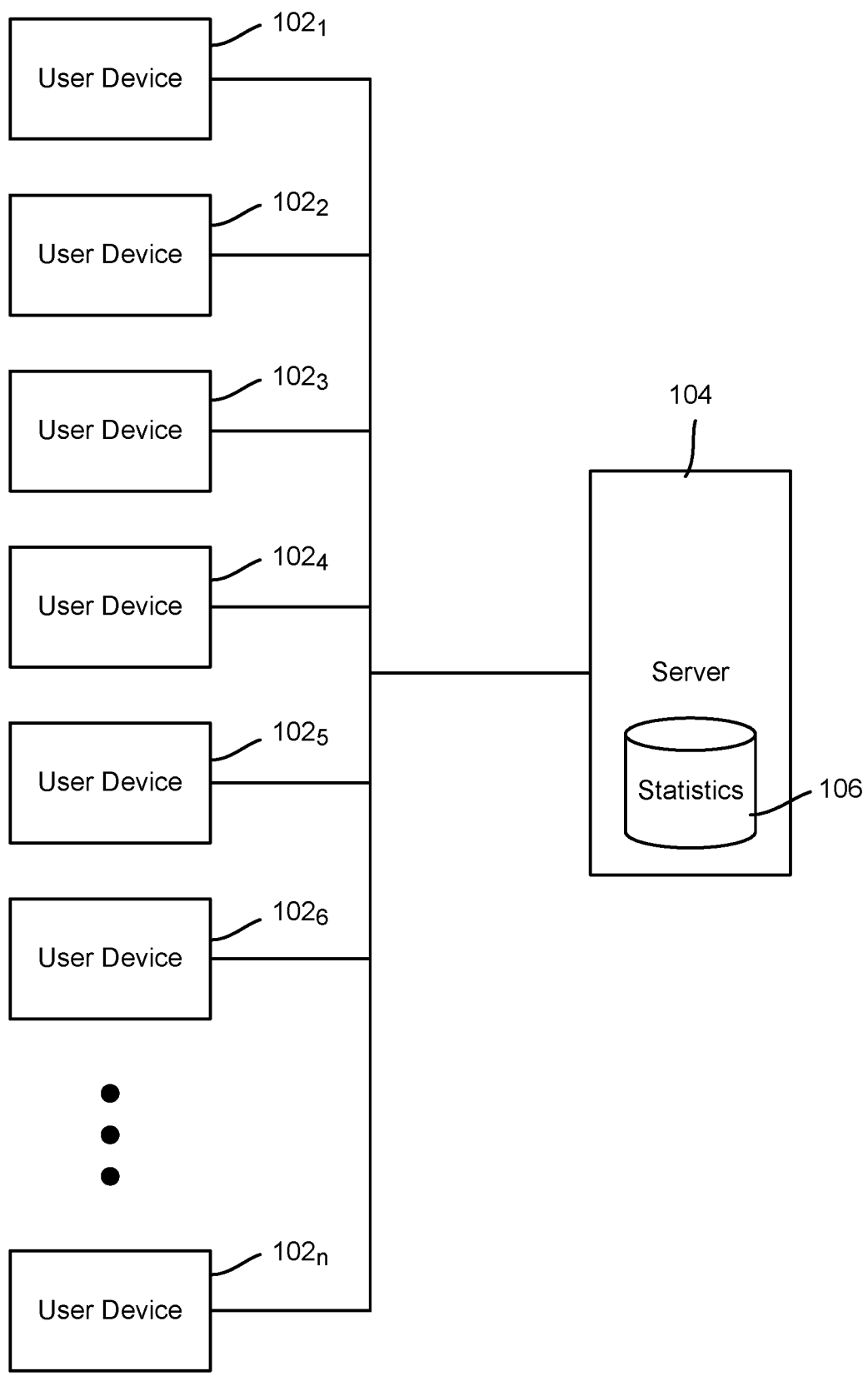
FIG. 1 is a block diagram representing example devices providing video-related statistics to a server, according to one or more example embodiments.

As represented in FIG. 1, a number of users' devices $102_1$-$102_n$ are coupled to a server 104 (e.g., a telemetry server) via any suitable network connection to provide information, referred to herein as statistics, that are related to video content being output. More particularly, the statistics that are gathered generally relate to viewers' interest levels with respect to what is currently being played, so as to use this information as described herein to select what are likely the "most interesting" segments of that video. It is these most interesting segments that are used as the basis for automatically curating one or more videos into a curated video that will be distributed in some way to users. For example, the most interesting fifteen minutes among several football games may be determined from the level of interest (a "goodness value") computed at each segment of each game; (note that as used herein, "interest"/"interest level" and "goodness" with respect to a portion of video are generally synonymous).

Figure 2:
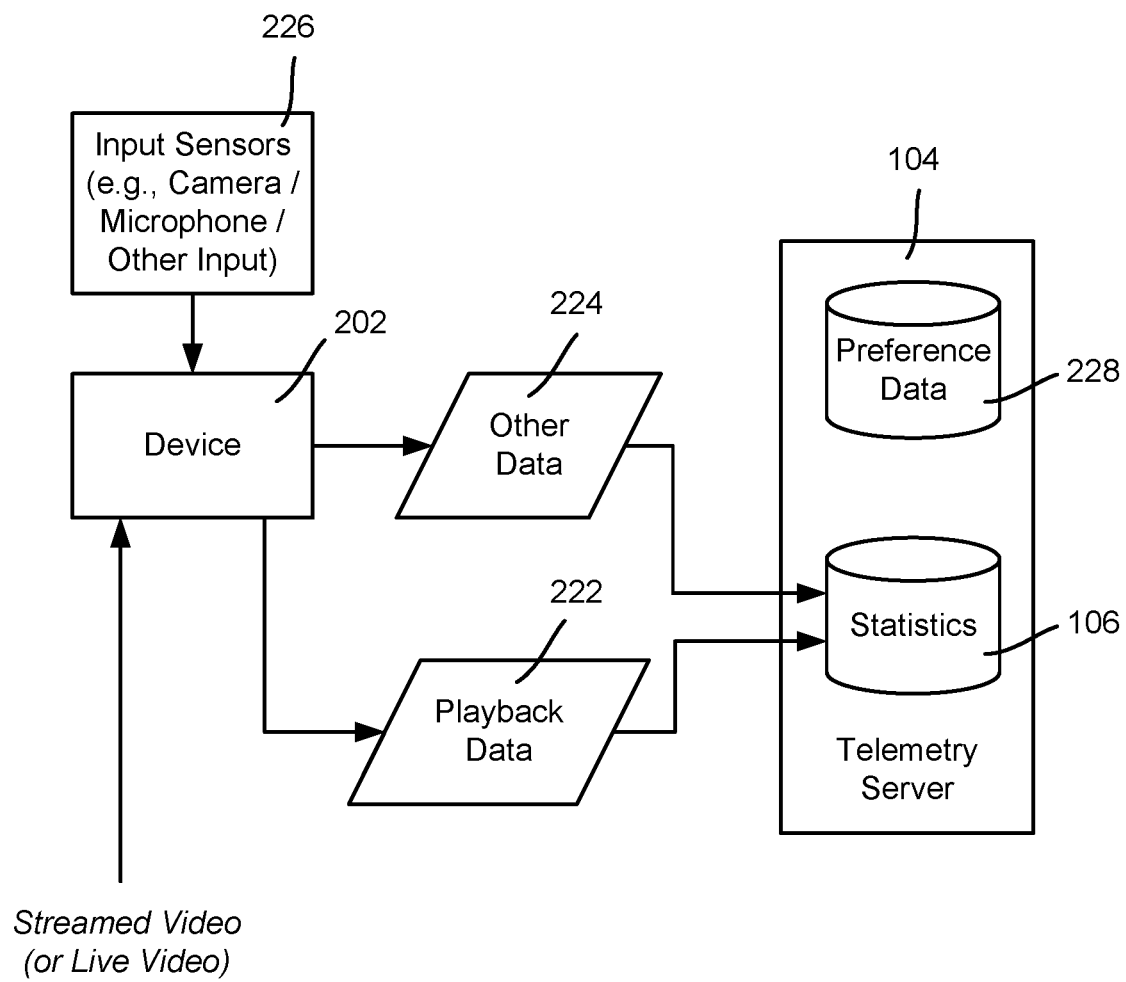
FIG. 2 is a block diagram representing various types of data that a device may collect and provide to a telemetry server for use as statistics in determining user interest levels for video segments, according to one or more example embodiments.

Streaming video is one way in which statistics may be captured, particularly playback data 222 (FIG. 2), which may be used as statistics. With streaming video, a user typically has a device with which he or she may interact to replay video, fast forward video, slow down video, and so forth, which provides playback data 222. These playback data 222 may be uploaded to the telemetry server 104 for processing into "interest" levels per segment. Note that because video is typically buffered to an extent, the playback data 222 are generally gathered at the device (rather than by interaction with the streaming server, for example), because, for example, with buffered data a user may replay a particular scene many times without ever going to the streaming server, whereby such statistics may be otherwise lost.

In addition to use with streaming video, statistics may be gathered from other sources. For example, digital video recorders (DVRs) in general provide playback functionality, and many of these recorders are connected to the Internet. Such networked DVRs can also participate in the collection of playback statistics relative to a video timeline (which at times may be live video) and report the statistics to the server, such as in exchange for receiving automatically curated content customized to the DVR owner.

The playback data 222 may include any statistics or the like that may be associated with specific portions of the video timeline and interactions with the device by the user. For example, playback statistics for a video timeline segment may include the number of times viewed (including rewinding or starting over, which may be separate data), the number of times fast-forwarded through, the number of times paused, or number of times the user slowed down (slow-mo-ed") the video, and so forth. Any other relevant playback statistics may be collected as well.

Other data 224 may be related to the level of activity (user behavior) during playing of video as detected by the viewer or viewers as sensed by sensors 226, e.g., a Kinect™ or other camera and/or microphone, with some level of further processing. For example, the volume level in the room may correspond to some a level of interest regarding the video that is playing at any given time.

Relatively straightforward audio processing can determine a user's or group's level of interest based on the audio, e.g., to determine whether the audio is cheering (evidence of a likely highlight during a sports video) versus steady conversation (evidence of nothing special going on during that same sports video), versus sudden quiet (evidence of a tense moment where something is about to happen) and so on. Movies and television shows may have other audio characteristics, e.g., laughter, silence (which is likely an indication of interest), conversation (which may indicate boredom or confusion) and so forth.

Similarly, relatively straightforward image processing may be used to determine a level of interest regarding a video timeline. This may include movement towards or away from the display screen, head tracking, eye tracking, skeletal tracking (which angle the user's head and/or body is facing, body language), and so on may be used.

Still further, direct manual input may be detected and used as other data 224/statistics. For example, a user may be shown a button with which to vote interest or specify interest with respect to a previous period of time (which may be user configurable), e.g., save the last ten seconds. This may be useful in evidencing some level of interest to other users, and/or generating a custom video for a given user. Still further, this may be used as feedback; for example, if a user indicates interest via a manual action, other data occurring at that time, such as noise levels, motion levels and so on may be collected to indicate a pattern among users at the time that interest was explicitly indicated.

Additional other data 224 such as time of day, day of week and so on may be collected. How much video a user watches may be another piece of data, and so on. Content-related data may be collected, e.g., how long was a total video relative to the total interaction time, what type of video was it (e.g., sports or a movie) and so on, Thus, as described herein, statistics comprising playback data 222 and other data 224 are gathered for each segment of a video's timeline, where a timeline segment may be any number of one or more frames or other useful time division as described herein. In one implementation, the statistics are sent from the many users' devices $102_1$-$102_n$ (including computers, game consoles and other interactive devices capable of playing video content) to the telemetry server 104 to aggregate this data among many users. Note that other networked ways to collect the data other than (or in addition to) a centralized server may be used, e.g., peer-to-peer, a mesh, and so forth.

Other statistics, such as current news, time-of-day, and so forth may be collected in conjunction with video segments. Still other information may include user behavior data that indicates a user is paying attention or not paying attention. For example, a significant percentage of users may be browsing other content during a segment, which is detectable, and may indicate a lack of interest.

The content also may be a factor. While in general the selection of video segments for automated curation as described herein may be content independent, the content itself and/or factors related to the content may be considered. For example, if cheering was occurring in a stadium as video was captured during a live event, then it is more likely that something interesting was occurring at the corresponding video segments. This may be used as a statistical clue as to what may be interesting. Knowing when a commercial advertisement occurs within the content may be considered; for example, people may act in a way that indicates a high level of interest the first time they see a commercial advertisement, but the people probably would not want any part of that commercial advertisement included in the curated video. Scene changes in a movie may be used as a guide indicative of how far before and/or after a high interest segment or set of segments may be buffered with additional segments for set-up context/unwinding of an interesting portion.

Once the playback and other statistics are gathered, the statistics are combined over many users to create an "interest" value for each time segment within a video. The interest value is used to assemble the (likely) most interesting parts of the video into the curated video as described herein.

Figure 3:
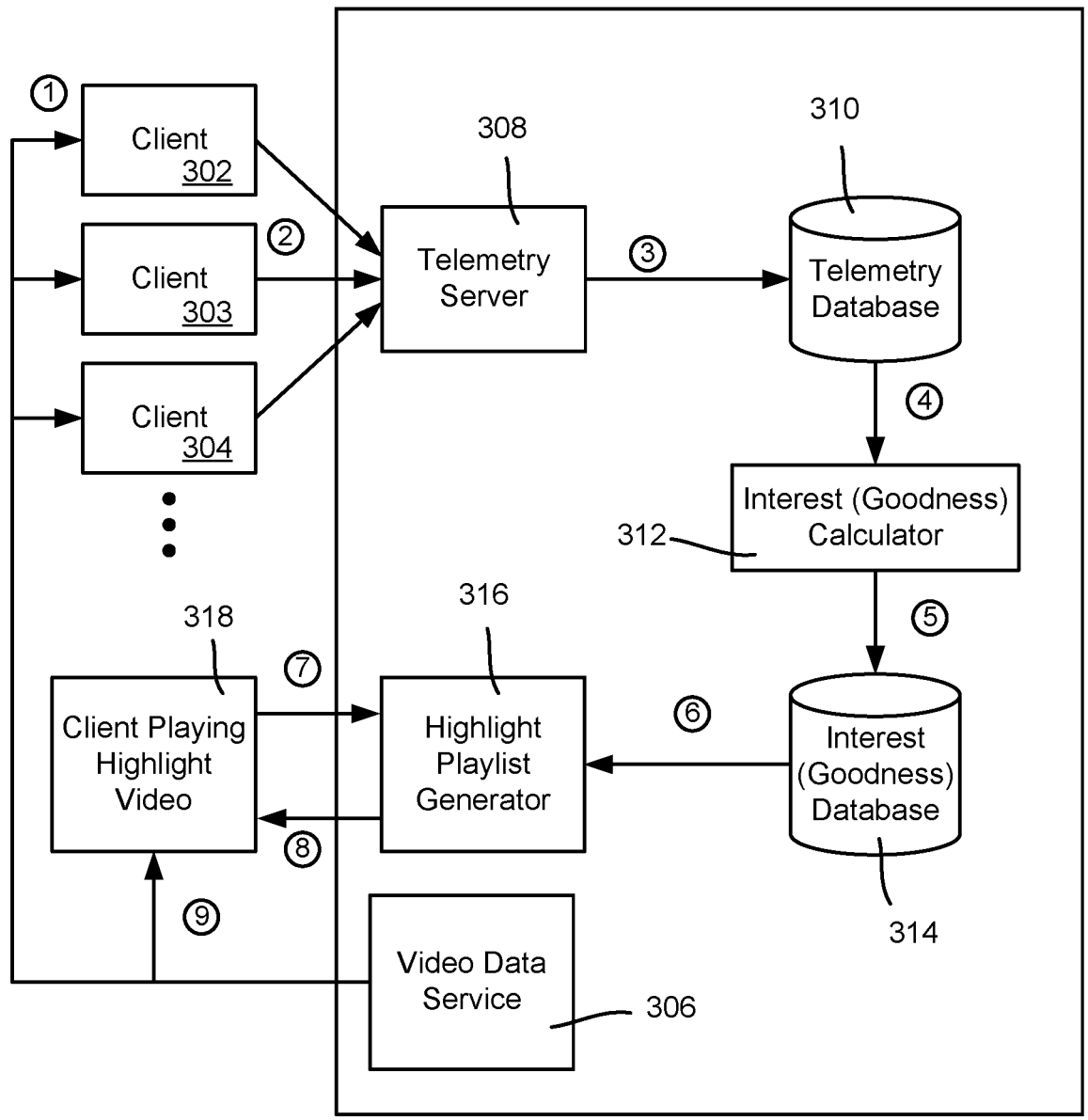
FIG. 3 is a block/dataflow diagram showing how data may be processed to generate a curated/highlight video, according to one or more example embodiments.

FIG. 3 exemplifies components of one embodiment. As represented in FIG. 3 by circled numeral one (1), clients 302-304 receive video data (e.g., over the internet) from a video data service 306. The video service 306 supplies each client with video data that includes a unique identifier for the video that the user is watching along with the video and audio data. Each frame of the video that is sent to the user has a corresponding frame number.

At circled numeral two (2), as clients of the video service watch videos, they report the frames that they watch to the telemetry service. If a user re-watches a section of video, or performs another playback-related activity, the client device sends additional reports. In other embodiments of the invention, a client may send other information associated with the frame, as well as other data as described herein.

A telemetry server 308 stores the data sent from the clients into a telemetry database 310 (circled numeral three (3)). As represented in FIG. 3 by circled numeral four (4), an interest/goodness calculator 312 aggregates the data from the telemetry database 310 and transforms the data into interest (goodness) data containing a numeric interest level value for each frame of each video. One technique for determining the goodness of a frame is to determine the total number of times that a frame has been watched and divide the total number by the total number of watched frames. The division by the total number of watched frames may "normalize" the goodness value across all videos; many other alternative methods of calculating a goodness value are feasible).

The calculated interest values are stored into an interest database 314 (circled numeral five (5)). The database 314 stores the interest value associated with each frame of each video.

The database 314 is connected to the highlight playlist generator 316. The highlight playlist generator 316 performs queries on the database 314 (circled numeral six (6)) to get the "good" sections of a video or videos. The highlight playlist generator 316 may be a server that provides an interface between the database 314 and clients.

A client 318 who wishes to obtain a highlight video sends a request for a playlist to the highlight playlist generator 316, as represented in FIG. 3 by circled numeral seven (7). In one implementation, the request comprises a video ID, or group of video IDs, and a desired duration for the highlight.

The highlight playlist generator 316 returns information (circled numeral eight (8)) containing the video IDs and frame IDs corresponding to the client's request. The client gets the video data associated with the playlist video IDs and frame IDs (circled numeral nine (9)). The client is able to play back the video data.

Figure 4:
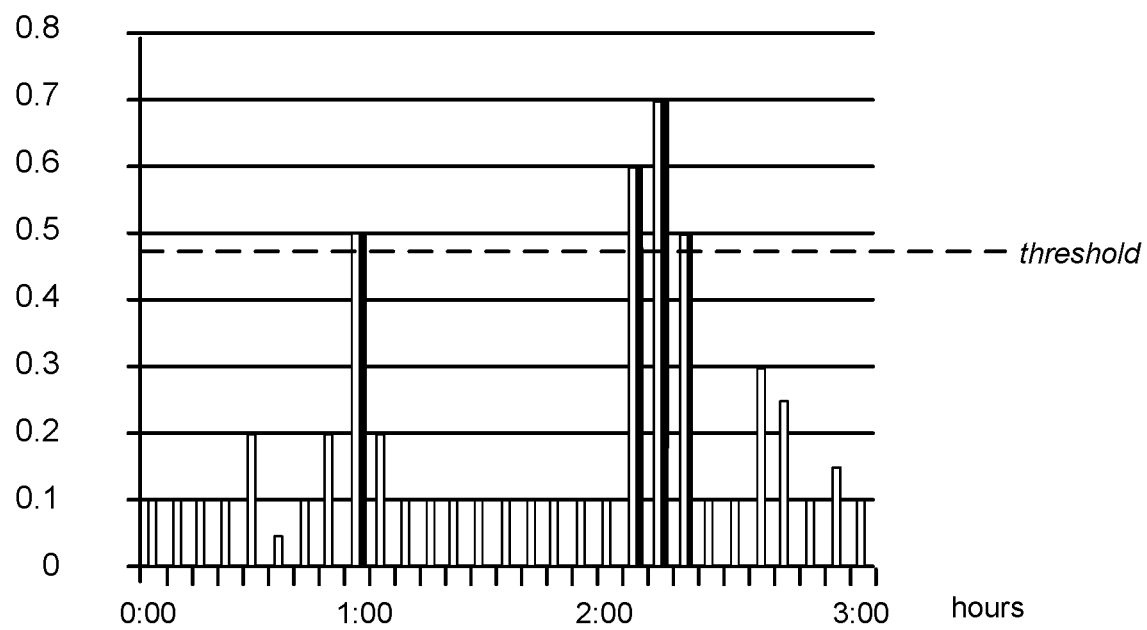
FIG. 4 is a representation of interest levels of various video segments, and selection of a subset of those video segments based on a threshold interest level, according to one or more example embodiments.

FIG. 4 is a representation of how playback statistics may be gathered and used to compute interest/goodness data for a particular video. This type of data may be stored in database, such as the interest database 314 of FIG. 3. The dotted horizontal line represents a threshold that may be applied in the highlight playlist generator to extract the "good" sections of the video for use in the highlight. The sections of the video whose goodness value (each represented by an unfilled lines) is above the threshold are used in the highlight video; those sections are represented by the solid filled black lines. The threshold line can be moved vertically, such as to obtain a sufficient number of segments to meet a user-specified total time for the curated video. Note that the total time criterion may be met by an approximate time, that is, the total time of the video need not be exact. For example, a user may specify that a playlist corresponding to a ten minute video be created, but for the system to select the likely most interesting segments, the playlist may correspond to a slightly shorter or longer video. This avoids the need for the system to fill a slightly shorter playlist with low interest segments, or cut high interest segments from a slightly longer playlist, just to try and meet an exact time. User preference data may guide such a total time rounding process.

Figure 5:
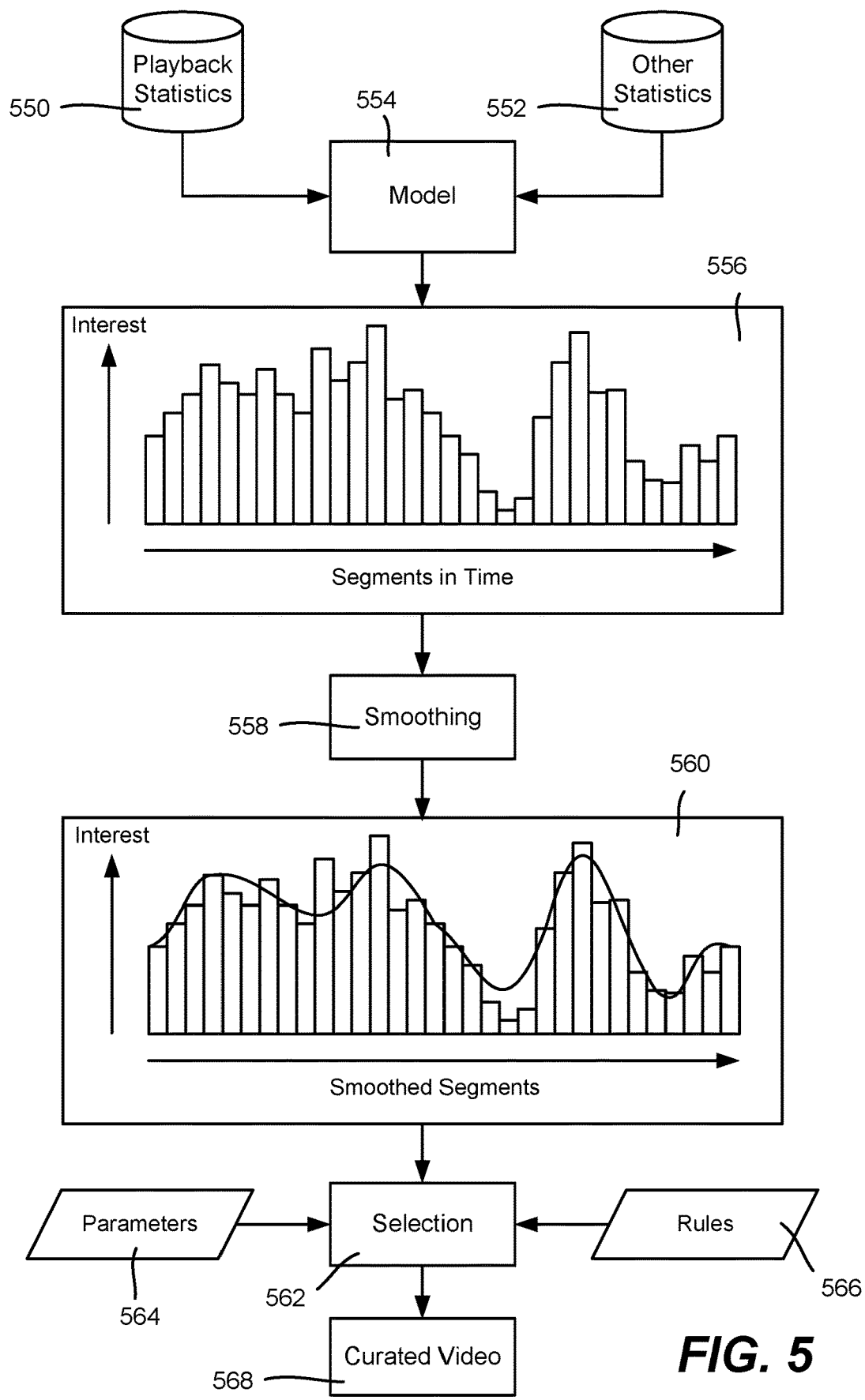
FIG. 5 is a block/dataflow diagram showing how statistical data may be processed to generate a curated/highlight video, according to one or more example embodiments.

FIG. 5 is another example showing how the playback statistics 550 (e.g., from the playback data 222) and other statistics 552 (e.g., from the other data 224) may be used to determine interest values for the segments. In general, a model 554 or the like, such as a model based upon learned weights for the types of statistics, processes the playback statistics 550 and other statistics 554 into level of interest values. Such weights may be learned in a known manner, including via some manual or otherwise collected training data, as well as on feedback, as described herein. For example, consider that the number of times a video segment is played has one weight, the number of times paused has another weight, and so on. Similarly, the other data such as the noise level, motion level and so forth may each have a weight. These weights may be multiplied by their values for a given segment, and summed into a per-segment value, which with other per-segment values over time form a bar graph/histogram 556 or the like, as represented in FIG. 5. Note that for multiple combined videos, such as several football games, the bar graphs/histograms or the like may be concatenated or otherwise treated as a group for purposes of selection of the most interesting among the combined data or group.

As can be readily appreciated, there may be different models for different types of content, e.g., a football model, a golf model, a drama model, a comedy model, an action movie model, and so forth. It is feasible for user preference data to influence a model, although segment selection may be more appropriate for user customization.

Note that a timeline segment may be, for example, time-based (e.g., one second) or frame-based. A segment may be as small as one frame, up to any practical number of frames. More granularity is provided by having smaller segments, but having smaller segments corresponds to needing more communication and storage. A segment may be discrete for all types of video (e.g., each segment is ten frames) or variable (for sports a segment may be ten frames, whereas for a television drama a segment may be twenty frames. Within sports, golf may have less interaction than baseball, and thus to save network bandwidth and data, segments for golf may be longer than for baseball. Segments size may vary within the same show, e.g., twenty frames at the beginning of a sporting event, five frames at the end, such as based on characteristics of how people tend to interact. Thus, the type of content may be a factor in determining the segment size and variability. Note that the length of a segment may need to be considered in the interest value computation.

After the interest values for the segments are obtained, smoothing 558 or the like may be performed to smooth out peaks and valleys among the segments' interest values, at least certain ones. Any suitable smoothing technique may be used. Note that smoothing may be per video, e.g., it is likely not desirable to smooth the end of one video with the beginning of the other.

With the segment interest values 556 or the smoothed segment interest values 560, the level of interest of a segment or series of segments is estimated. Selection of the segments (block 562) with the highest interest values is thus straightforward. Parameters 564, such as corresponding to user preference data 228 (FIG. 2) may be used, e.g., if the user has specified that only ten minutes is desired, the segments that provide the top ten minutes are selected.

Rules 566 may be applied as part of the selection, such as to provide desirably viewable content in the curated video 568. For example, a rule may ensure that any included video is at least five seconds in length (which for example may be user-configurable in the preference data). This prevents insertion of a very short clip (which may lack context, be annoying, be confusing and so forth) into the curated video. Another option is to pad a very short video segment with segments of before and after content on either side. For example, a highly exciting part of a video may only last one or two seconds, even when smoothing is considered. Rather than exclude such segments entirely, or only show the one-or-two second clip, including a few seconds before and after (not necessarily the same amounts of time) may provide context that is useful and enjoyable. Note that playback statistics may help avoid this, as people will likely rewind to a few seconds before an interesting scene, but this is not necessarily true in all cases.

Other parameters may be considered in the selection, such as other user preferences and/or user-provided rules. Depending on how much information the source content provides, different types of sports, movie genres and so on may be differentiated from one another. For example, consider a user who is interested in a highlight video from this weekend's sports, with an emphasis on football. Before selection, the values of the segments (whether before or after smoothing) may be multiplied based upon the user's preferences. In this way, for this user mostly football is more likely to be selected over other sports, unless something very interesting occurred, e.g., a hole-in-one in golf was replayed by many people. A user may specify rules (no soccer), percentages (sixty percent football, ten percent baseball, thirty percent everything else), favorite teams to emphasize, and so on.

Other factors may be considered in the selection, such as current news items. For example, a user may indicate that breaking news may be considered in the selection, so that, for example, if something unusual occurs, more weight may be given to an event that does not yet have a lot of statistics.

The result is a set of video segments that when put together provides a curated video 568 that is customized for a user. Note that individual customization need not be performed, e.g., a user may be clustered with other users, and those user be given a fixed length video, or the ability to pick from among a limited number of fixed length videos.

One type of curated video is a fixed length highlight reel. To generate a highlight video of a specified length from a set of videos, the computer sorts the time segments by "interest" and then selects the top N segments, where N is chosen such that the total time is the specified time length. These time segments are then used to generate a playlist. The playlist consists of a list of video identifiers (VideoIds) with associated timeline cut points.

The processing to generate the timeline playlist may occur on a server, or on the end-user's computer. The playlist may be used to generate instructions for a video player that operates on existing videos, or the playlist may be used to generate a new video file.

Thus, the video need not be curated as an actual video, but rather as a playlist in a per-user or group manifest or the like from which the curated video may be located and streamed, e.g., on demand. For example, the user may have a list built for him or her such as VideoID3, segments 1-20, VideoID3, segments 30-33, VideoID8, segments 10-19 and so on (although in actual use GUIDs or the like are generally used for such identifiers). When the user requests the curated video, the segments may be assembled on demand, and streamed to the user, e.g., from a cloud service or the like.

Another type of curated video is a varied speed highlight reel. A variable speed playback reel assigns a playback speed for each segment of the video according to the "interest" value of each time segment, such that "good" parts of the video play at a slower speed, and less "good" parts of the video play at a faster speed. A threshold speed may be specified, above which that portion of the video is skipped entirely.

Slow motion may be provided for very "good" parts, possibly repeated after the regular speed of playback. Indeed, some repetition of the same segments may be built into the video. User preferences may determine aspects of fast motion, slow motion, repetition, and so forth.

Where multiple video events are combinable in any sequence that makes sense, ordering (as well as repetition of) of the segments may be considered, e.g., to mix very good with less good so as to maintain interest throughout, put "good" ones up front, put favored team highlights ahead of less favored teams, and so on. Ordering and repetition are possible even within the same video event; for example, a video may "attract" a user by showing a climactic moment at the beginning, then show the segments that led up to that moment, and repeat the climactic moment at the end.

Music and/or special effects may be added to the video, which again may be based upon user preference data. For example, with the varied speed highlight reel, music may play at one level when the speed of playback is high (such that the regular played back audio would be otherwise unnatural), and then drop to another level (or pause/cut out) when the regular audio is available at slower speeds. Alternatively, the regular audio may cut out without music at higher playback speeds, and thereby when it returns, give the user an indication that more interesting content is now being played. Special effects such as flashing, color changes and so forth may be added to attract a user to the "more interesting" content being played or about to be played.

Figure 6:
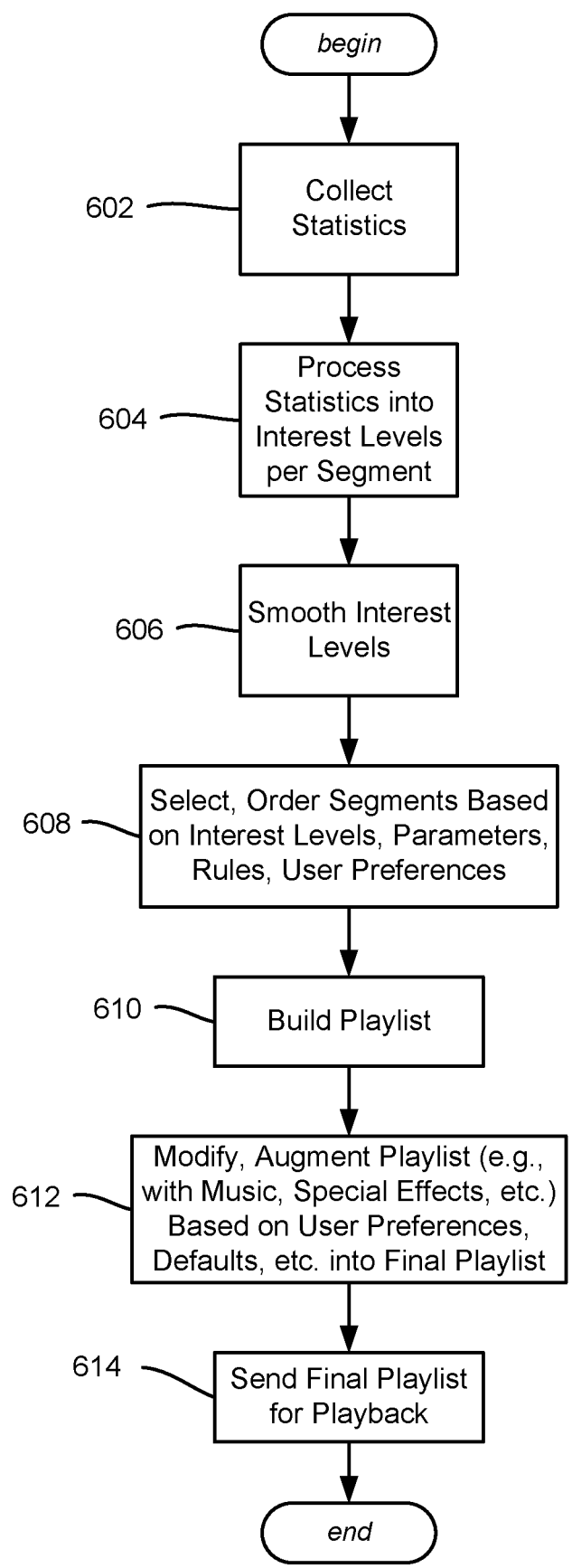
FIG. 6 is a flow diagram showing example steps that may be taken to generate a curated/highlight video playlist, according to one example embodiment.

FIG. 6 summarizes some of the above aspects. Step 602 represents collecting the statistics. Step 604 represents processing the statistics via a model or other scoring mechanism (e.g., as in FIG. 4) into the interest levels per segment, which may be smoothed (step 606).

Step 608 selects (and optionally orders) the segments to include in the curated video. The selection is based upon the interest levels in general, and further may be based upon any number of criteria, including user preferences, parameters and rules, and/or system parameters and rules. Step 610 builds the playlist to match the selected and possibly ordered segments.

Step 612 represents optionally modifying and/or augmenting the playlist (e.g., with music, special effects, and so forth), such as based on user preferences, defaults, and the like into a final playlist. For example, a user may specify that rock music be played with the curated video; the music may be selected from the user's own device audio playlist.

Step 614 sends the final playlist to the user for playback as desired. Note that once a final playlist for a curated video is created, a user may change preferences and request that a new playlist be generated. A user also may interact with the playlist via a suitable editing tool or the like to edit/customize a playlist further.

Note that statistics regarding the user interaction with the playback of the curated video itself may be collected, such as for use as training data. For example, if many users replay the same segments in their respective curated videos, then it is likely that this was interesting, whereas if many users skip over other segments, these are likely less interesting. The models/weights thus may be self-tuned based upon their actual results. Manual feedback, in which a user indicates a like or dislike for a curated video or particular segments therein, also may be leveraged.

Assisting with manual editing is also possible via the data collected herein. For example, consider that the input may be used as a level of interest indicator to someone deciding which scenes to include and which to cut from a lengthy program.

Example Operating Environment

It can be readily appreciated that the above-described implementation and its alternatives may be implemented on any suitable computing device, including a gaming system, personal computer, tablet, DVR, set-top box, smartphone and/or the like. Combinations of such devices are also feasible when multiple such devices are linked together. For purposes of description, a gaming (including media) system is described as one exemplary operating environment hereinafter.

Figure 7:
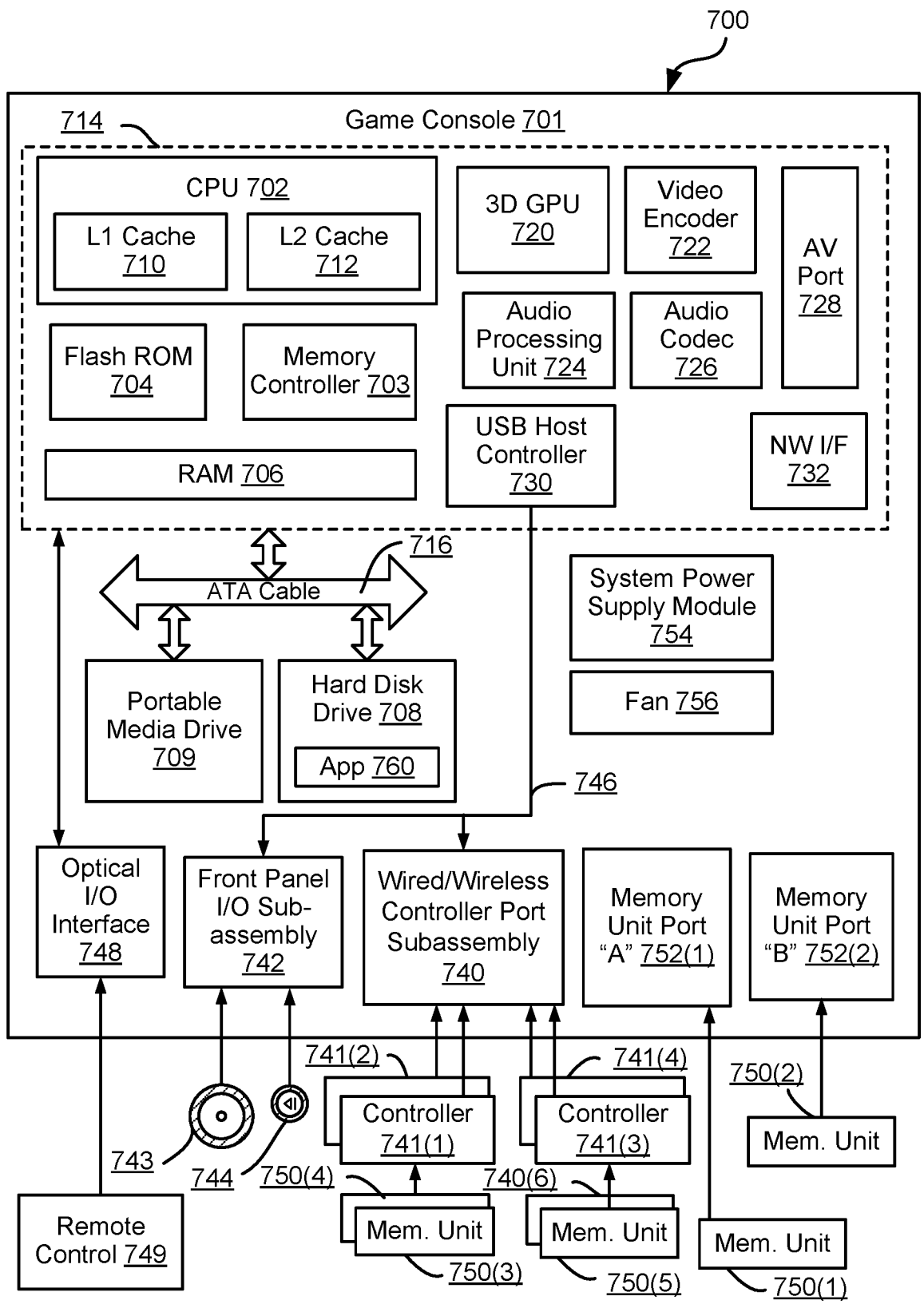
FIG. 7 is a block diagram representing an exemplary non-limiting computing system or operating environment, e.g., in the example of a gaming console, in which one or more aspects of various embodiments described herein may be implemented.

FIG. 7 is a functional block diagram of an example gaming and media system 700 and shows functional components in more detail. Console 701 has a central processing unit (CPU) 702, and a memory controller 703 that facilitates processor access to various types of memory, including a flash Read Only Memory (ROM) 704, a Random Access Memory (RAM) 706, a hard disk drive 708, and portable media drive 709. In one implementation, the CPU 702 includes a level 1 cache 710, and a level 2 cache 712 to temporarily store data and hence reduce the number of memory access cycles made to the hard drive, thereby improving processing speed and throughput.

The CPU 702, the memory controller 703, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 702, the memory controller 703, the ROM 704, and the RAM 706 are integrated onto a common module 714. In this implementation, the ROM 704 is configured as a flash ROM that is connected to the memory controller 703 via a Peripheral Component Interconnect (PCI) bus or the like and a ROM bus or the like (neither of which are shown). The RAM 706 may be configured as multiple Double Data Rate Synchronous Dynamic RAM (DDR SDRAM) modules that are independently controlled by the memory controller 703 via separate buses (not shown). The hard disk drive 708 and the portable media drive 709 are shown connected to the memory controller 703 via the PCI bus and an AT Attachment (ATA) bus 716. However, in other implementations, dedicated data bus structures of different types can also be applied in the alternative.

A three-dimensional graphics processing unit 720 and a video encoder 722 form a video processing pipeline for high speed and high resolution (e.g., High Definition) graphics processing. Data are carried from the graphics processing unit 720 to the video encoder 722 via a digital video bus (not shown). An audio processing unit 724 and an audio codec (coder/decoder) 726 form a corresponding audio processing pipeline for multi-channel audio processing of various digital audio formats. Audio data are carried between the audio processing unit 724 and the audio codec 726 via a communication link (not shown). The video and audio processing pipelines output data to an A/V (audio/video) port 728 for transmission to a television or other display/speakers. In the illustrated implementation, the video and audio processing components 720, 722, 724, 726 and 728 are mounted on the module 714.

FIG. 7 shows the module 714 including a USB host controller 730 and a network interface (NW I/F) 732, which may include wired and/or wireless components. The USB host controller 730 is shown in communication with the CPU 702 and the memory controller 703 via a bus (e.g., PCI bus) and serves as host for peripheral controllers 734. The network interface 732 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 7, the console 701 includes a controller support subassembly 740, for supporting four game controllers 741(1)-741(4). The controller support subassembly 740 includes any hardware and software components needed to support wired and/or wireless operation with an external control device, such as for example, a media and game controller. A front panel I/O subassembly 742 supports the multiple functionalities of a power button 743, an eject button 744, as well as any other buttons and any LEDs (light emitting diodes) or other indicators exposed on the outer surface of the console 701. The subassemblies 740 and 742 are in communication with the module 714 via one or more cable assemblies 746 or the like. In other implementations, the console 701 can include additional controller subassemblies. The illustrated implementation also shows an optical I/O interface 748 that is configured to send and receive signals (e.g., from a remote control 749) that can be communicated to the module 714.

Memory units (MUs) 750(1) and 750(2) are illustrated as being connectable to MU ports "A" 752(1) and "B" 752(2), respectively. Each MU 750 offers additional storage on which games, game parameters, and other data may be stored. In some implementations, the other data can include one or more of a digital game component, an executable gaming application, an instruction set for expanding a gaming application, and a media file. When inserted into the console 701, each MU 750 can be accessed by the memory controller 703.

A system power supply module 754 provides power to the components of the gaming system 700. A fan 756 cools the circuitry within the console 701.

An application 760 comprising machine instructions is typically stored on the hard disk drive 708. When the console 701 is powered on, various portions of the application 760 are loaded into the RAM 706, and/or the caches 710 and 712, for execution on the CPU 702. In general, the application 760 can include one or more program modules for performing various display functions, such as controlling dialog screens for presentation on a display (e.g., high definition monitor), controlling transactions based on user inputs and controlling data transmission and reception between the console 701 and externally connected devices.

The gaming system 700 may be operated as a standalone system by connecting the system to high definition monitor, a television, a video projector, or other display device. In this standalone mode, the gaming system 700 enables one or more players to play games, or enjoy digital media, e.g., by watching movies, or listening to music. However, with the integration of broadband connectivity made available through the network interface 732, gaming system 700 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for automatically generating a curated set of content, the method comprising:
    collecting at least one statistic related to a playback of segments of the set of content, the at least one statistic comprising user behavior data representative of a level of activity of a user during the playback of content;
    processing the at least one statistic to determine a level of interest of the user associated with each segment of the set of content;
    selecting a set of the segments as having a most interest among the segments based at least in part on the level of interest associated with the selected set of segments;
    receiving, from a second user, a set of rules for curating the set of content; and
    based on the received set of rules:
        providing the selected set of the segments in a set of data corresponding to a curated set of the set of content to the user; and
        presenting the curated set of the set of content to the second user.

2. The method of claim 1, wherein the set of content is a video.

3. The method of claim 2, wherein processing the at least one statistic further comprises image processing, including at least one of head tracking, eye tracking, and skeletal tracking.

4. The method of claim 1 further comprising, adjusting a threshold value to select the set of segments of the set of content based upon a total time criterion for the curated set of the set of content, the total time criterion comprising a total time for the curated set of the set of content.

5. The method of claim 1 further comprising, smoothing the levels of interest for a plurality of the segments.

6. The method of claim 1 wherein including the selected set of the segments in the set of content comprises adding an identifier and a segment identifier for the selected set of the segments to a playlist.

7. The method of claim 1 wherein the set of rules comprises one or more of the following: a time duration of the curated set of the set of content, weights added to a particular category, and an exclusion of one or more categories.

8. The method of claim 1 wherein collecting the at least one statistic related to set of content playback further comprises: collecting statistics related to user interest in each of the segments based upon video captured during the playback of the segments of the set of content, including image processing to determine the level of interest of the user regarding a timeline based on the user behavior data.

9. The method of claim 1 wherein collecting the at least one statistic related to the playback of the segments of the set of content further comprises: collecting statistics related to user interest in a segment based upon audio captured during the playback of the segments of the set of content, wherein the level of interest of a user is determined based on the audio.

10. The method of claim 1 further comprising associating at least one segment in the set of data with a different playback speed relative to at least one other segment, in which the playback speed is based at least in part on a level of interest of the user for the at least one segment.

11. A system for automatically generating a first curated set of content and a second curated set of content, the system comprising:
    a telemetry server configured to collect at least one first statistic including data representative of user interaction with segments of content while the content is being presented to a user, the at least one first statistic comprising user behavior data representative of a level of activity of a user during the playback of the segments of the content;
    an interest calculator mechanism configured to process the at least one first statistic into a level of interest of the user for each of the segments; and
    one or more processors programmed to:
        select a set of segments of the content as having a most interest among the segments based at least in part upon the level of interest of the user for each of the segments;
        receive, from a second user, a set of rules for a curated set of content; and
        based on the received set of rules:
            providing the selected set of the segments in a set of data corresponding to a curated set of the content to the user; and
            presenting the curated set of the content to the second user.

12. The system of claim 11 wherein the data representative of user interaction with the segments comprises at least one of: a number of times the user has played a segment, a number of times the user has skipped a segment, a number of times the user has fast forwarded over a segment, a number of times the user has replayed a segment, or a number of times the user has slowed down playback of a segment.

13. The system of claim 11 wherein the interest calculator mechanism comprises a model having weights associated with different types of user interaction with the segments of the content during the playback.

14. The system of claim 11 wherein the user behavior data further comprises data representative of user behavior during playing of the segments and wherein collecting at least one first statistic related to the playback of the content of the segments further comprises:
    collecting statistics related to the user interest in each of the segments based upon audio captured during the playback of the segments, wherein the level of activity of the user is determined based on the audio.

15. The system of claim 11 wherein the playlist generator selects the selected set of segments based at least in part upon one or more rules or one or more parameters, or upon both one or more rules and one or more parameters.

16. The system of claim 11 wherein the playlist generator is further configured to associate a different playback speed with at least one selected segment relative to at least one other segment.

17. One or more computer-readable memory devices having computer-executable instructions, which when executed perform operations, comprising:

collecting at least one statistic related to playback of segments of content, the at least one statistic comprising user behavior data representative of a level of activity of a user during the playback of the segments of the content;

processing the at least one first statistic to estimate which of the segments of the content are more interesting to users than other segments of the content;

building a data set based at least in part upon the processing of the at least one statistic, the data set representing a subset of the segments, the subset including segments that are estimated to be above an interesting threshold;

receiving, from a second user, a set of rules for curated content; and based on the received set of rules:
providing the data set for use in requesting playback of the subset of the segments corresponding to a curated set of the content; and
presenting the curated set of the content to the second user.

18. The one or more computer-readable memory devices of claim 17 wherein building the data set comprises selecting segments for the subset based upon meeting a total time criterion, the total time criterion comprising a total time for the curated set of the content.

19. The one or more computer-readable memory devices of claim 17 wherein building the data set comprises selecting segments for the subset based upon one or more rules.

20. The one or more computer-readable memory devices of claim 17 wherein building the data set comprises selecting segments for the subset based upon user preference data.

* * * * *